Dec. 11, 1928.

H. R. LIEBERT ET AL 1,694,861

LANDING EQUIPMENT FOR AIRSHIPS

Filed April 11, 1927

INVENTOR
*Herman R. Liebert.*
BY *Wilhelm Fischer.*

ATTORNEY

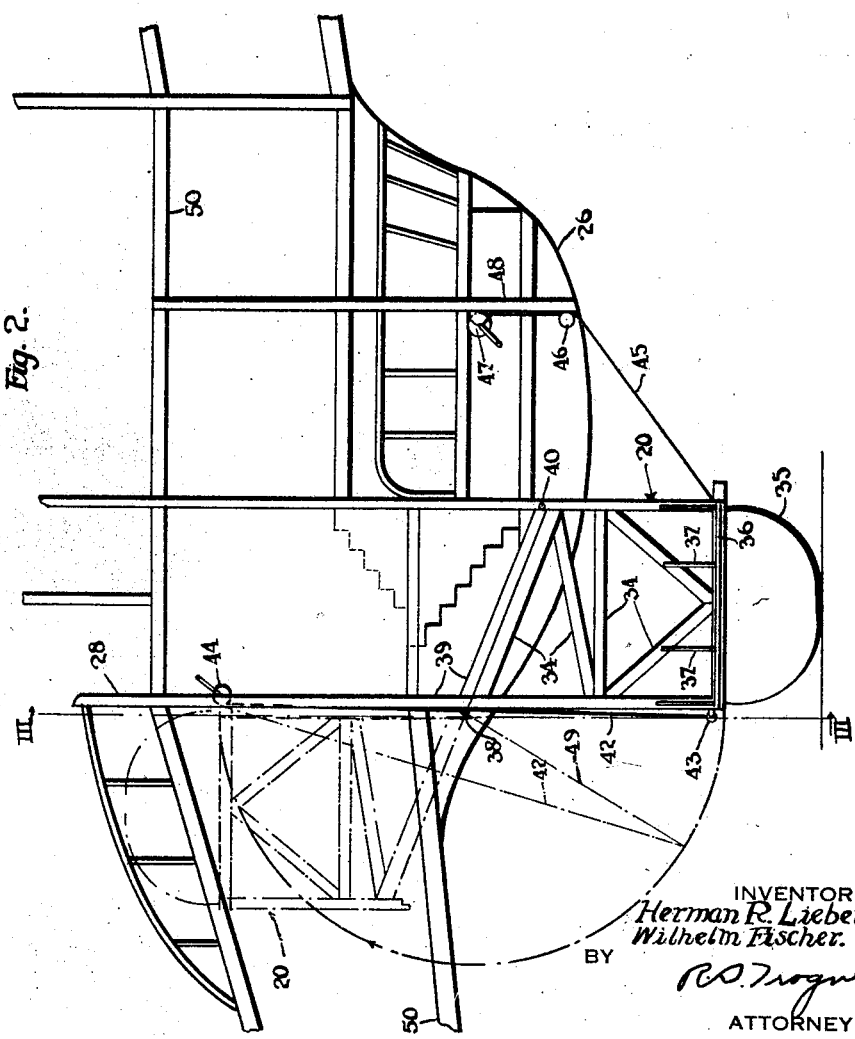

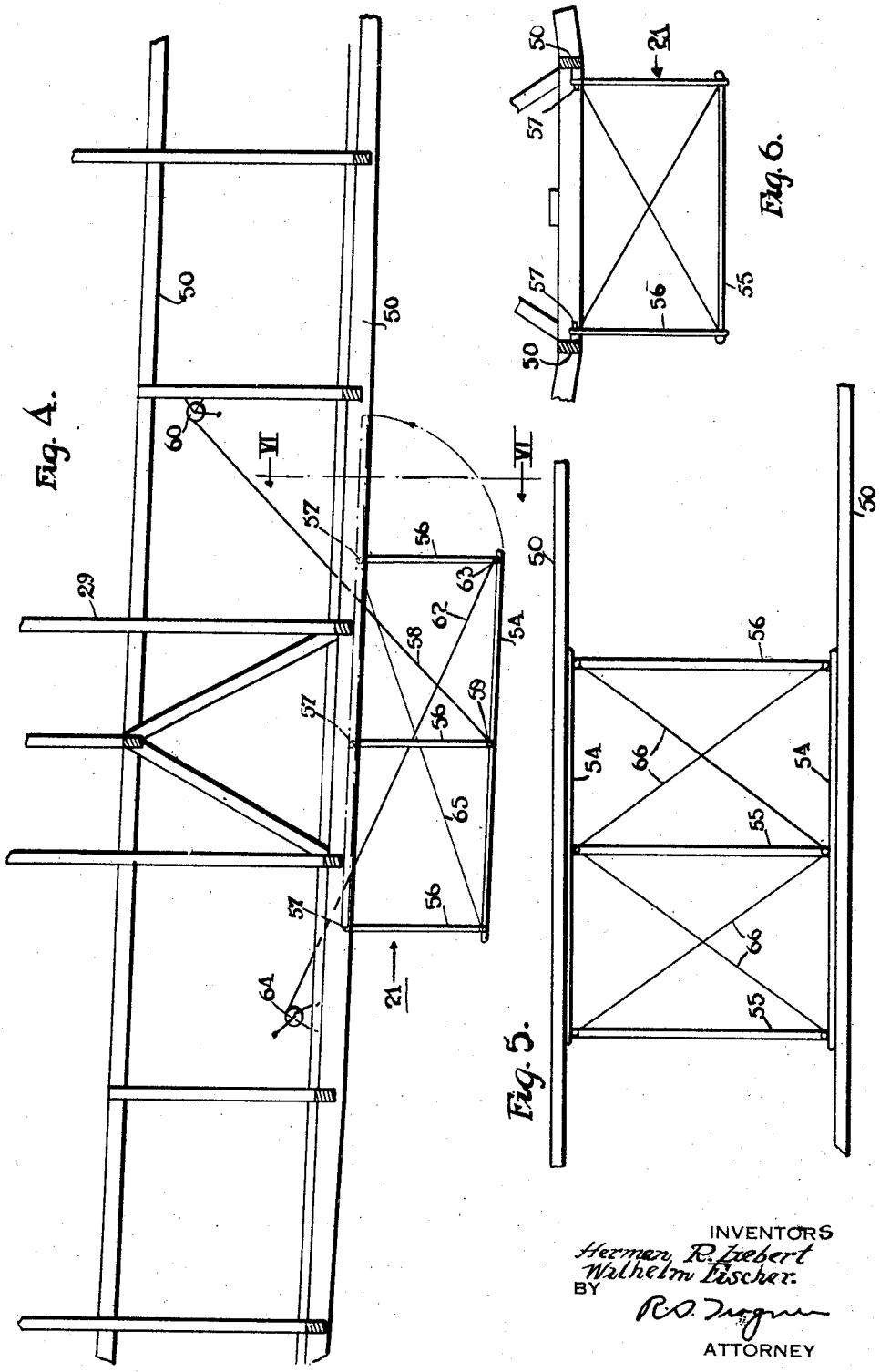

Dec. 11, 1928.
H. R. LIEBERT ET AL
1,694,861
LANDING EQUIPMENT FOR AIRSHIPS
Filed April 11, 1927    5 Sheets-Sheet 4
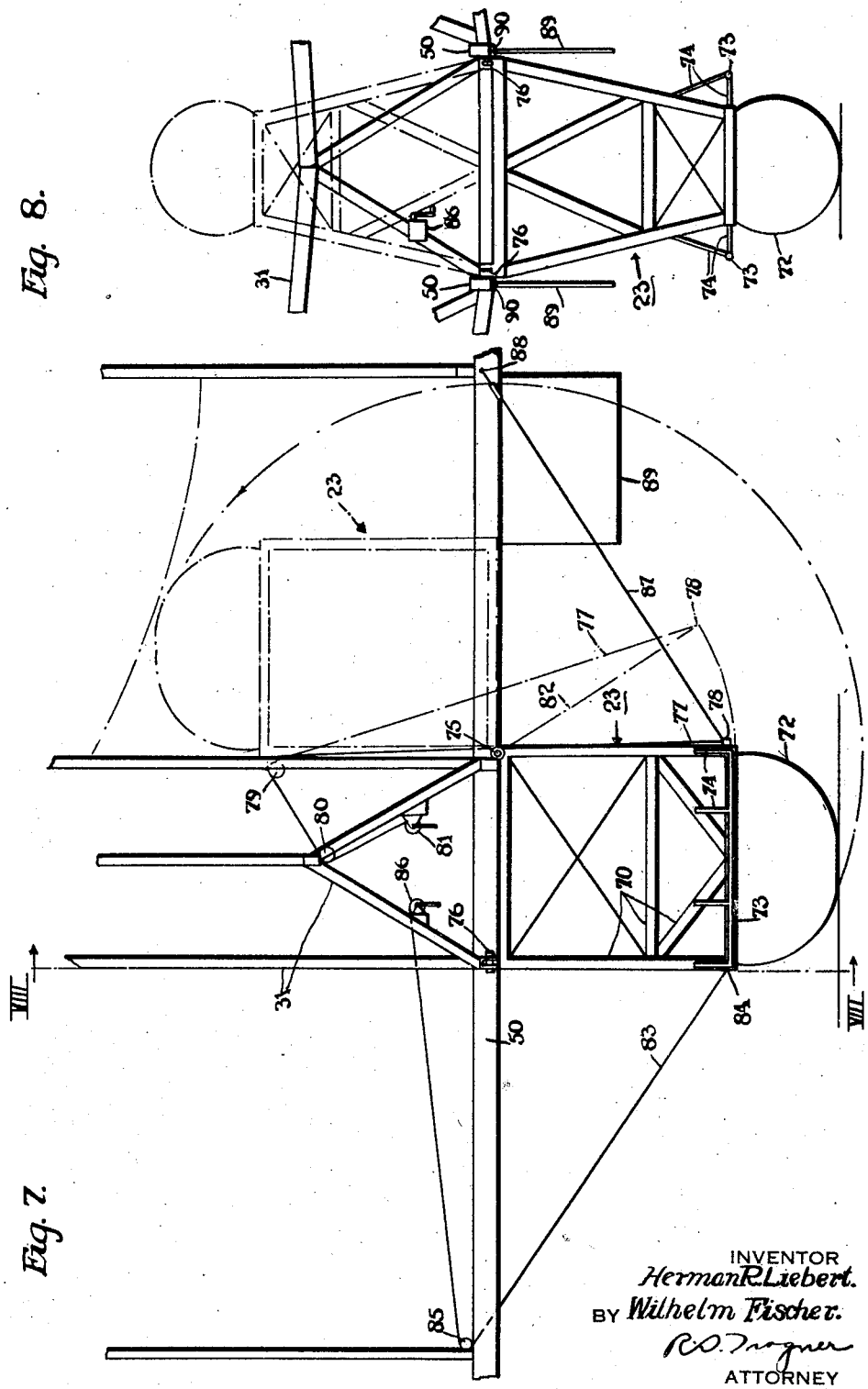
INVENTOR
*Herman R. Liebert.*
BY *Wilhelm Fischer.*
ATTORNEY Dec. 11, 1928.  H. R. LIEBERT ET AL  1,694,861
LANDING EQUIPMENT FOR AIRSHIPS
Filed April 11, 1927   5 Sheets-Sheet 5

INVENTOR
Herman R. Liebert.
Wilhelm Fischer.
BY
R.O. ~~~
ATTORNEY

Patented Dec. 11, 1928.

1,694,861

UNITED STATES PATENT OFFICE.

HERMAN RICHARD LIEBERT AND WILHELM FISCHER, OF AKRON, OHIO, ASSIGNORS TO GOODYEAR ZEPPELIN CORPORATION, OF AKRON, OHIO, A CORPORATION OF DELAWARE.

LANDING EQUIPMENT FOR AIRSHIPS.

Application filed April 11, 1927. Serial No. 182,559.

Our invention relates to airships and it has particular relation to apparatus designed for the purpose of facilitating the landing operation of so-called rigid and semi-rigid airships.

One object of our invention is to provide a landing equipment for an airship which permits the ship to maintain a substantially unobstructed stream line formation under ordinary conditions of operation.

Another object of our invention is to provide a landing equipment which normally is maintained within the stream line contour of the airship and which may be positioned outwardly of the airship cover during landing operations.

Another object of our invention is to provide landing equipment units including buffers which are adapted to be removed from sight during ordinary flight operations of an airship.

Airships of the semi-rigid and rigid type, when they have descended sufficiently near the ground to be handled manually, have heretofore been controlled by means of handling lines and frames which were rigidly attached to the gondola or other lower portions of the airship hull, or under certain conditions devices were provided by which handling frames could be attached to the airship as it approached the ground. The provision of permanent rigidly attached frames caused considerable wind resistance as well as an unsightly appearance of the airships. The tendency in recent years has been to build airships of increased size and it has been found that the old type of landing equipment is entirely inadequate properly to handle the larger craft when they are landed. The later designs of airships have power units enclosed within the outer surface of the hull and for that reason landing equipment units of the old type would be required to extend a considerable distance outwardly from the surface of the hull, in order to provide for sufficient clearance between the lower portion of the hull and the ground when the airship is being moved into a hangar. These units would cause greatly increased wind resistance when the ship is in flight. Moreover, in the event removable frames were employed, a great deal of time would be consumed in attaching a relatively large number of units that would be required for a large airship. Another disadvantage of the detachable type of equipment lies in the fact that gusts of wind are likely to strike the ship at any time and render the installation of the removable frames very difficult to accomplish.

It is the aim of this invention to retain the advantages of the removable and rigidly mounted types of landing equipment and at the same time obviate the disadvantages of marring the stream line contour of the airship, as well as obviating the wind resistance caused by the previously known types of permanently mounted equipment.

For a better understanding of our invention, reference may now be had to the accompanying drawings, forming a part of this specification, of which:

Fig. 2 is a fragmentary elevational view of one of the units embodying our invention attached adjacent the gondola of an airship, parts of the airship hull being omitted for the sake of clearness;

Fig. 3 is a fragmentary cross-sectional view taken substantially along the line III—III of Fig. 2;

Fig. 4 is a fragmentary view, partially in elevation and partially in cross-section, illustrating one of the units embodying our invention;

Fig. 5 is a fragmentary plan view of the construction shown by Fig. 4, the view being taken from the lower side of the airship hull;

Fig. 6 is a fragmentary cross-sectional view taken substantially along the line VI—VI of Fig. 4;

Fig. 7 is a fragmentary view, partially in elevation and partially in cross-section, illustrating one of the units embodying our invention;

Fig. 8 is a fragmentary cross-sectional view taken substantially along the line VIII—VIII of Fig. 7;

Figure 1:
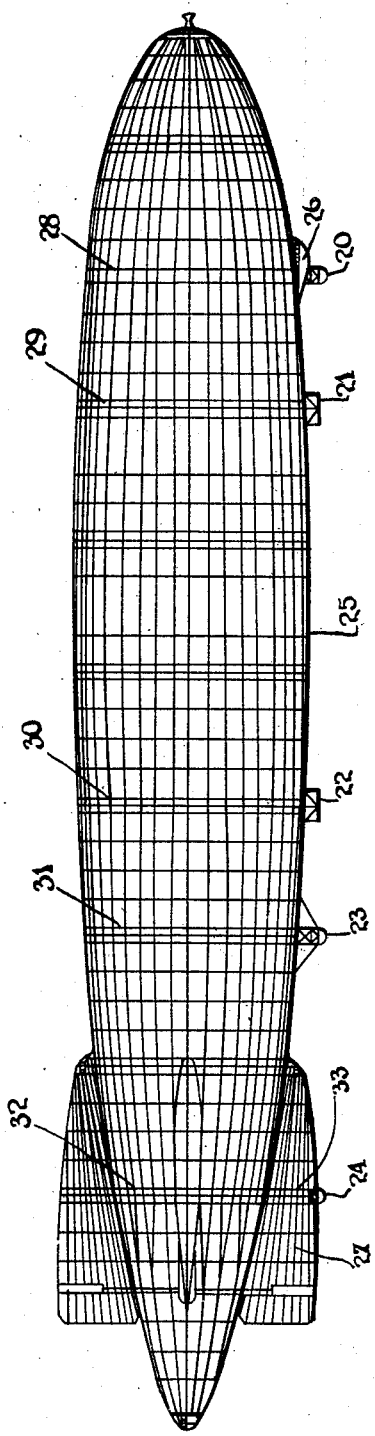
Fig. 1 is an elevational view of an airship illustrating the general application of our invention.
Figure 9:
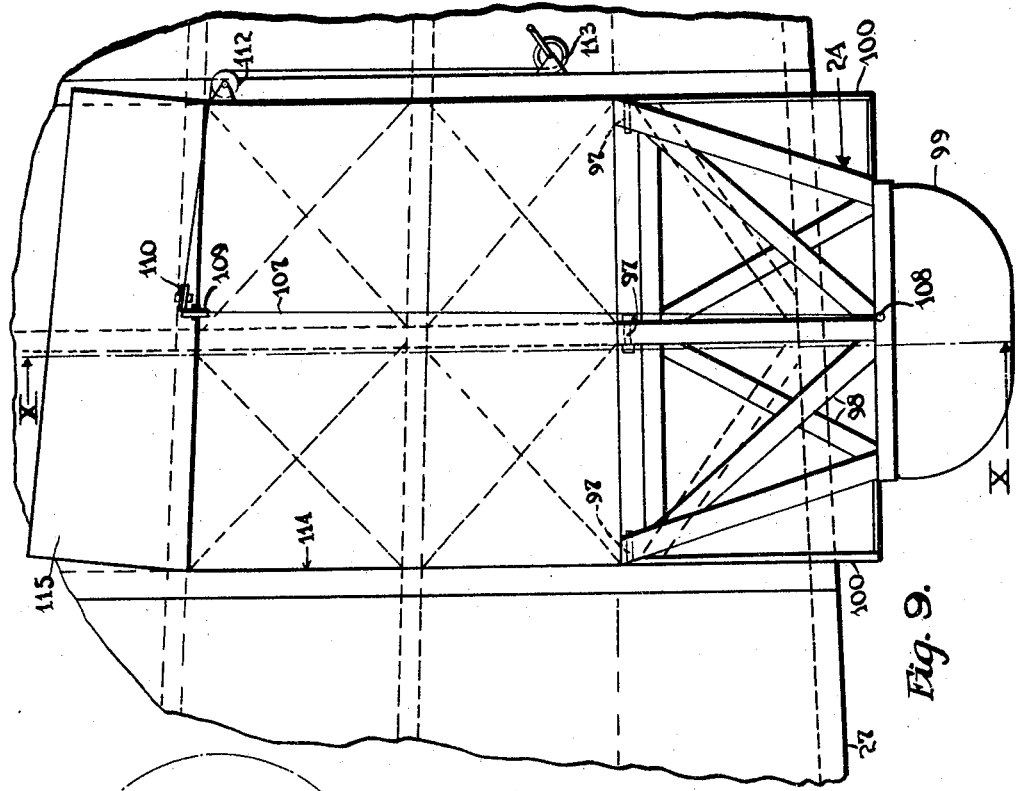
Fig. 9 is a fragmentary elevational view of one of the units embodying our invention attached to the fin of an airship.

In practicing our invention, a number of landing equipment units 20, 21, 22, 23 and 24, illustrated diagrammatically by Fig. 1, are attached to an airship hull 25 which includes in its construction a gondola or pilot car 26 and a fin 27 forming a rigid portion of the hull structure. The hull is also provided with a plurality of transversely disposed main rings 28, 29, 30, 31 and 32, which serve to strengthen the hull and therefore to provide stable anchoring framework for the respective landing equipment units. The frame work of the main ring 32 continues through the rigid fin, as indicated at 33.

As best shown in Figs. 2 and 3, the unit 20 is composed of a plurality of frame members 34 which rigidly support a buffer 35 secured to the lower portion thereof. Also handling rails 36, which are braced by means of rods 37, are rigidly secured along the sides of the unit. A hinge 38 is provided for pivotally securing the unit 20 to structural elements 39 constituting the lower portions of the main ring 28, and also a portion of the gondola 26. The unit is positively and rigidly secured in this position by means of the hinge and a releasable fastening device 40.

One end of a cable 42 is secured, as indicated at 43, adjacent the lower portion of the unit 20 and is attached to a winch 44, that is mounted upon one of the main frame elements 39. A similar cable 45, secured to the opposite side of the unit extends over a pulley 46 and is attached to a second winch 47. Both the pulley 46 and winch 47 are secured to a frame member 48 of the airship hull.

By releasing the fastening device 40, the unit will swing sidewise by force of gravity to a position indicated by dot and dash lines 49. From this position sufficient leverage can be obtained from the winch 44 to the connection 43 about the hinge 48 to swing the unit 20 upwardly about the hinge 38 until it is positioned within the airship hull. While this operation is being performed, the cable 45 is reeled from the winch 47, or the cable 45 may be detached from the unit when the latter is drawn upwardly within the airship hull. There is sufficient clearance between lower frame members 50, which extend longitudinally of the airship, to permit the unit to be swung upwardly therebetween. A portion of the outer cover is removed in order to provide an opening of proper size between the frame members 50 through which the unit is moved and which is adapted to be closed by means of swinging doors 52 hinged to the hull, as indicated at 53. When the unit 20 is in operative position, as shown in full lines of Fig. 2, both cables 42 and 45 may be tightened by rotating the winches in opposite directions thereby providing bracing similar to that afforded by the employment of guy wires.

The units 21 and 22 are identical in construction and are positioned upon intermediate portions of the airship hull. Since these units are identical, a description of one will suffice for a complete understanding of both.

Although the unit 21 is somewhat different in construction from the unit 20, the result obtained by its use is substantially the same. Referring to Figs. 4, 5 and 6, this unit consists of two spaced parallel handling rails 54, which are connected by means of transverse rods 55, the outer ends of which are pivotally connected to the ends of a plurality of frame elements 56. One end of each frame element 56 is pivoted to one of the lower hull frame members 50, as indicated at 57.

A cable 58, connected at 59 to the lower portion of the unit 21, extends upwardly to a winch 60 which is adapted to be operated in order to collapse the unit between the hull elements 50 within the normal surface contour of the airship. The dot and dash lines of Fig. 4 illustrate the position of the unit when it is collapsed. While the unit is being collapsed a cable 62, connected at 63 to the lower portion of the unit, is reeled from a winch 64 and a bracing cable 65, connected to diagonally disposed corners of the unit, becomes slack. The winch 64 is suitably mounted upon the frame members 50 of the hull. In order to secure rigidly the frame elements of the unit in the position shown in full lines of Fig. 4, the winch 64 is operated in the proper direction to tighten the bracing cable 65. The cables 62 and 65 are thus tensioned in opposite directions and provide for stable mounting of the unit. Additional bracing cables or wires 66 secured adjacent the connecting points of the members 54 and 55 serve to stabilize the lower portion of the unit 21.

The unit 23 comprises frame members 70, which rigidly support a buffer 72, and a handling rail 73, braced by means of rods 74, is secured upon each side of the unit, (Figs. 7 and 8). A hinge 75 mounted upon the hull elements 50 provides a pivotal connection for the unit to the airship hull and a latch or other fastening device 76 opposite the hinge is adapted to secure the unit rigidly in operative position. One end of a cable 77 is connected adjacent the lower portion of the unit, as indicated at 78, and is trained over a pair of pulleys 79 and 80, which are secured to the frame members of the main ring 31. The other end of the cable is attached to a winch 81. By releasing the latch 76 the unit 23 swings to one side by force of gravity to the position indicated by dot and dash lines 82. Thereafter, by reeling in the cable upon the winch 81, the unit is drawn upwardly into an inoperative position, indicated by dot and dash lines of Fig. 7, within the hull of the airship.

One end of a second cable 83 is connected to the unit, as indicated at 84, opposite the connection 78 and is trained about a pulley 85. The other end of the cable is connected to a winch 86, that is mounted upon the frame elements of the main ring 31. This cable serves as a brace and is rendered taut by operating the winch 86. If desirable, a detachable guy rope or cable 87 may be attached at the connection 78 and to one of the hull elements, as indicated at 88. These additional cables assist in stabilizing the landing unit, although under ordinary conditions the hinge 75 and latch 76 insure a sufficiently rigid mounting of the unit upon the hull.

A pair of swinging doors 89 pivotally connected, as indicated at 90, to the frame elements 50 are adapted to be closed after the unit 23 has been drawn into the hull of the airship, thereby providing a substantially uniform surface corresponding to the normal hull surface. Also, it will be observed that the lower portion of the unit, in its inoperative position, lies substantially flush with the outer surface of the hull.

The unit 24 is composed of two identical parts 95 and 96, each of which is connected to the fin 27 by means of hinges 97. These identical parts include frame elements 98 and buffers 99, together with extensions or flaps 100, the latter completing a substantially rectangular form of each part of the unit.

Figure 10:
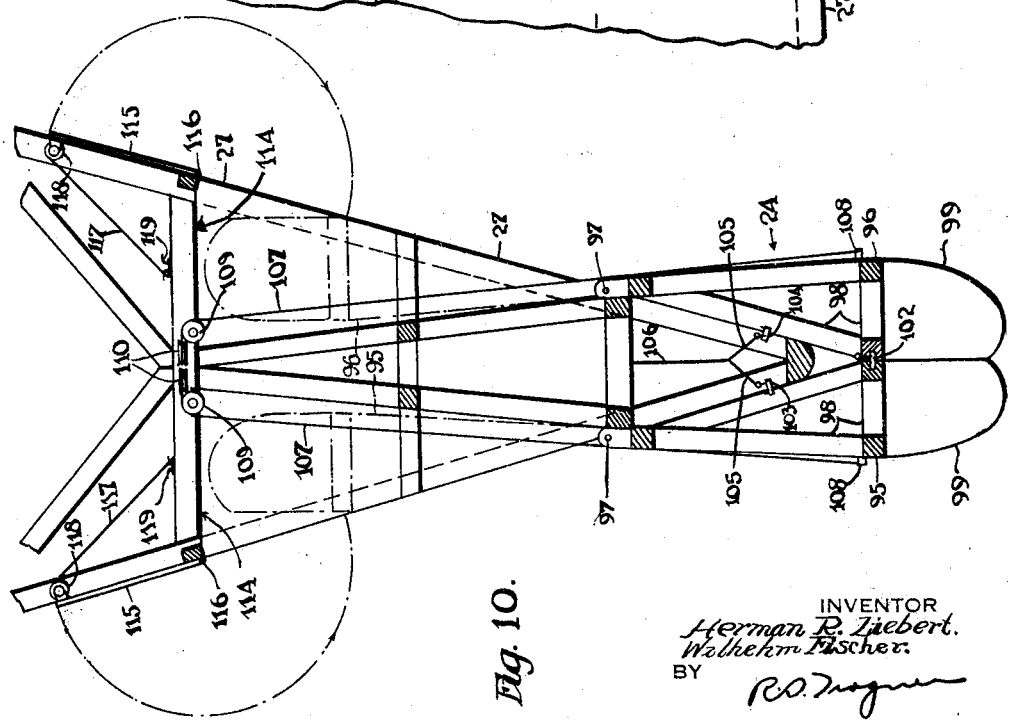
Fig. 10 is a cross-sectional view taken substantially along the line X—X of Fig. 9.

In their operative positions, shown by full lines in Fig. 10, the lower portions of the parts 95 and 96 are temporarily connected together by means of a suitable attaching device 102. Additional connecting elements 103 and 104 are connected by means of forked portions 105 of a cable 106, which is operated by a suitable winch or other actuating device (not shown). Upward force exerted by the cable 106 draws the members 95 and 96 toward each other and tends to maintain them in rigid operative relation. The connections 102, 103 and 104 are adapted to be released preparatory to moving the parts of the unit 24 into their inoperative position. A cable 107, having one end connected at 108 to each part of the unit 24, is trained over a pair of pulleys 109 and 110 and thence over the pulley 112. The other end of the cable is attached to a winch 113 mounted upon one of the hull frame members.

In order to move the parts 95 and 96 into their inoperative position, the connections 102, 103 and 104 are released, and by operating the winch 113 the cable 107 draws the respective parts upwardly into an opening 114 within the side of the fins and into the position indicated by dot and dash lines of Fig. 10. By releasing the connections 102, 103 and 104, the parts 95 and 96 will swing outwardly a slight distance by force of gravity, or they may be forced outwardly by other suitable means until sufficient leverage can be obtained from the pulley 109 to the connection 108 about the hinge 97. In the position of the parts of the units 24 shown by dot and dash lines in Fig. 10, they are entirely within the surface contour of the fin and a portion of one side of each part is substantially flush with the surface of the fin. The remaining portion defined by the buffers 99 is covered by means of a door which is provided with a hinge 116 secured to the side of the fin and has a cable 117 connected thereto. This cable is trained over a pulley 118 and is adapted to be secured to a suitable anchoring device 119. The door 115, together with the sides of the unit 24, provide a substantially continuous stream line surface for the fins while the unit is in its inoperative position.

From the foregoing description, it will be apparent that our invention is peculiarly adapted to be embodied in rigid and semi-rigid airships and that neither the appearance of the hull nor the wind resistance will be appreciably increased by the installation of the landing equipment units described. The units 20, 23 and 24 are sufficiently large and are so constructed as to be adapted to serve as observation cars or they may be armed with machine guns or other armament. These additional functions should not interfere with the primary function of serving as landing equipment.

Although we have illustrated but the preferred forms which our invention may assume and have described those forms in detail, it will be apparent to those skilled in the art that it is not so limited but that various minor modifications and changes may be made therein without departing from the spirit of our invention or from the scope of the appended claims.

What we claim is:

1. An airship comprising a hull having fins constituting a portion thereof, landing equipment units, a plurality of which have buffers secured thereto, handling frames secured to a plurality of the units, means for securing the units to the hull, means normally maintaining the units within the surface contour of the hull and means for moving the units outwardly beyond the surface contour of the hull and securing them rigidly in the latter position.

2. An airship comprising a hull having fins constituting a portion thereof, landing equipment units, buffers secured to a plurality of the units, handling frames secured to a plurality of units, means for pivoting the units to the hull, said unit being pivotable through an angle of approximately 180°, and means for positively securing the units with respect to the hull in either of two positions defined by the limits of said 180° angle, the equipment units projecting from the hull when secured in one of said positions.

3. In an airship having a fin secured to its lower portion, a two part landing bumper secured to the fin, means for drawing the parts of the bumper inwardly within the surface contour of the fin, and means for securing the parts of the bumper together in its operative position.

4. An airship comprising a hull having a rigid framework along its lower portion, landing equipment units disposed at a plurality of locations upon the framework, said framework being provided with recesses for receiving the units, means connected to the framework and to each unit for moving the latter from the recesses, flexible bracing members secured to each unit and to points on the hull spaced therefrom, said members being movable into the recesses, and means normally covering the recesses when the units are either removed therefrom or disposed therein.

5. An airship comprising a hull including transverse main rings and longitudinal frame members, connected together, landing units having connections to the lower portion of the hull, each of said units extending substantially the entire distance between two adjacent longitudinal frame members and means for moving each unit on the connections and between the longitudinal frame members into the hull.

6. An airship comprising a hull including transverse main rings and longitudinal frame members, connected together, landing units composed of structural framework having connections to the lower portion of the hull, each of said units extending substantially the entire distance between two adjacent longitudinal frame members and means for moving each unit on the connections and between the longitudinal frame members into the hull.

In witness whereof, we have hereunto signed our names.

HERMAN RICHARD LIEBERT.
WILHELM FISCHER.